LARGE SCALE MEMORY DEVICE

Filed Oct. 28, 1957 6 Sheets-Sheet 1

INVENTOR
Rudy C. Stiefel

BY Victor D. Borst

ATTORNEY

INVENTOR
Rudy C. Stiefel
BY Victor D. Borst
ATTORNEY

June 7, 1960 R. C. STIEFEL 2,940,068

LARGE SCALE MEMORY DEVICE

Filed Oct. 28, 1957 6 Sheets-Sheet 3

INVENTOR
Rudy C. Stiefel

BY Victor D. Borst

ATTORNEY

June 7, 1960 R. C. STIEFEL 2,940,068

LARGE SCALE MEMORY DEVICE

Filed Oct. 28, 1957 6 Sheets-Sheet 4

INVENTOR
Rudy C. Stiefel

BY Victor D. Borst

ATTORNEY

June 7, 1960 R. C. STIEFEL 2,940,068

LARGE SCALE MEMORY DEVICE

Filed Oct. 28, 1957 6 Sheets-Sheet 5

INVENTOR
Rudy C. Stiefel
BY Victor D. Borst
ATTORNEY

LARGE SCALE MEMORY DEVICE

Filed Oct. 28, 1957 6 Sheets-Sheet 6

INVENTOR
Rudy C. Stiefel
BY Victor D. Borst
ATTORNEY

United States Patent Office
2,940,068
Patented June 7, 1960

2,940,068

LARGE SCALE MEMORY DEVICE

Rudy C. Stiefel, New York, N.Y., assignor to Sperry Rand Corporation, Ford Instrument Company Division, Long Island City, N.Y., a corporation of Delaware Filed Oct. 28, 1957, Ser. No. 692,759

14 Claims. (Cl. 340—174)

This invention relates generally to cataloging or filing devices and more specifically to a method and means for storing large quantities of information in such a manner that a desired bit of information can be rapidly selected and reproduced.

Various devices of the aforesaid character have been devised for storing large quantities of information, all of which have certain inherent advantages and disadvantages. It is therefore one of the principal objects of this invention to combine in one mechanism the advantages of the various prior devices while eliminating the disadvantages thereof.

Another object of the invention is to provide a storage or filing means by which great quantities of information may be stored in a comparatively small space.

Another object of the invention is to provide in a storage mechanism of the aforesaid character, electronically controlled and actuated means by which a desired bit of information may be rapidly selected and reproduced in response to a code signal imparted thereto.

In accordance with the present invention I employ suitable cards the faces of which are coated with a magnetizable medium such as iron oxide. The information in magnetic form is impressed on the faces of the cards in equally spaced parallel tracks, there being preferably about twenty-five tracks on each side of a card. The cards are stored vertically in horizontally extending rows in a specially designed card case or cabinet. Each case is provided with a plurality, preferably four, of vertically stacked similar rows. Each row is provided with a pair of spaced upper and lower card holders, which are accessible from the front of the cabinet. The opposed faces of each pair of card holders are provided with a plurality of equally spaced parallel grooves, preferably about four hundred, which extend from the front to the rear of the holders, by and between which the cards are slidably supported for withdrawal from the front of the cabinet. The card holders are so arranged and positioned in the cabinet that the cards in any one row are disposed in vertical alignment with the cards in the other rows.

The card case is provided with a horizontally movable carriage which extends from the top to the bottom of the case and is adapted to be moved back and forth from side to side of the case, in front of the vertically stacked rows of cards therein, by a digital positional servo which positions the carriage in front of any selected one of the vertically aligned card positions in the rows. The horizontally movable carriage has a vertically movable carriage mounted thereon which is adapted to be moved up and down between the various rows of cards, by a modified servo which positions the vertically movable carriage in front of any selected one of the horizontally extending card rows.

The vertically movable carriage has a card puller and a pair of opposed read-write magnetic head assemblies mounted thereon. Each magnetic head assembly comprises a plurality of individually mounted spring-loaded contact-type magnetic heads, there being one head for each recording track on the cards. The card puller comprises a card engaging hook which is mounted on a slide which is adapted to be moved back and forth toward and away from the front of the card case by a suitable motor and driving mechanism.

The horizontal carriage, the vertical carriage, the card puller, and the read-write magnetic heads are all rendered operative, in response to a fed-in code, to select the proper card in the case, withdraw it from and return it to the case, and to read the desired bit of information thereon as the card is being withdrawn from the case. The card puller is positioned in front of the selected card by the horizontal and vertical carriages which are operated simultaneously, thus minimizing card selection time. As soon as the card puller is positioned in front of the selected card the hook engages the card and withdraws it from the case between the two read-write magnetic head assemblies. As the card passes between the two assemblies the information on both sides thereof is simultaneously read by the magnetic heads through an external control register which is preset by the fed-in code so that only the desired portions of the data read-out from the total card are transmitted either to a buffer storage or directly to output equipment as desired.

A two-level non-return magnetic recording system is used in which the magnetic circuit therefor is designed to permit either the playback of existing information on the card, or the recording of new information on the card. The writing in of new information on the card automatically erases whatever was previously recorded on that portion of the card. This self-erase feature permits replacement at any time of any or all of the data stored on a card and thereby enables the cards to be repeatedly used for different applications as desired.

In order to provide practically unlimited storage capacity, for random bits of data, in a comparatively small space a plurality of card cabinets each with its own card selecting, pulling and reproducing assembly may be stacked both horizontally and vertically in building block formation.

Having stated the principal objects of the invention other and more limited objects of the invention will be apparent from the following specifications and the accompanying drawings forming a part thereof in which:

Figs. 1 and 1A joined together on the lines *a—a* constitute a front elevation of an apparatus constructed according to my invention, for storing a great number of different bits of information and for automatically reproducing selected bits thereof;

Figure 1:
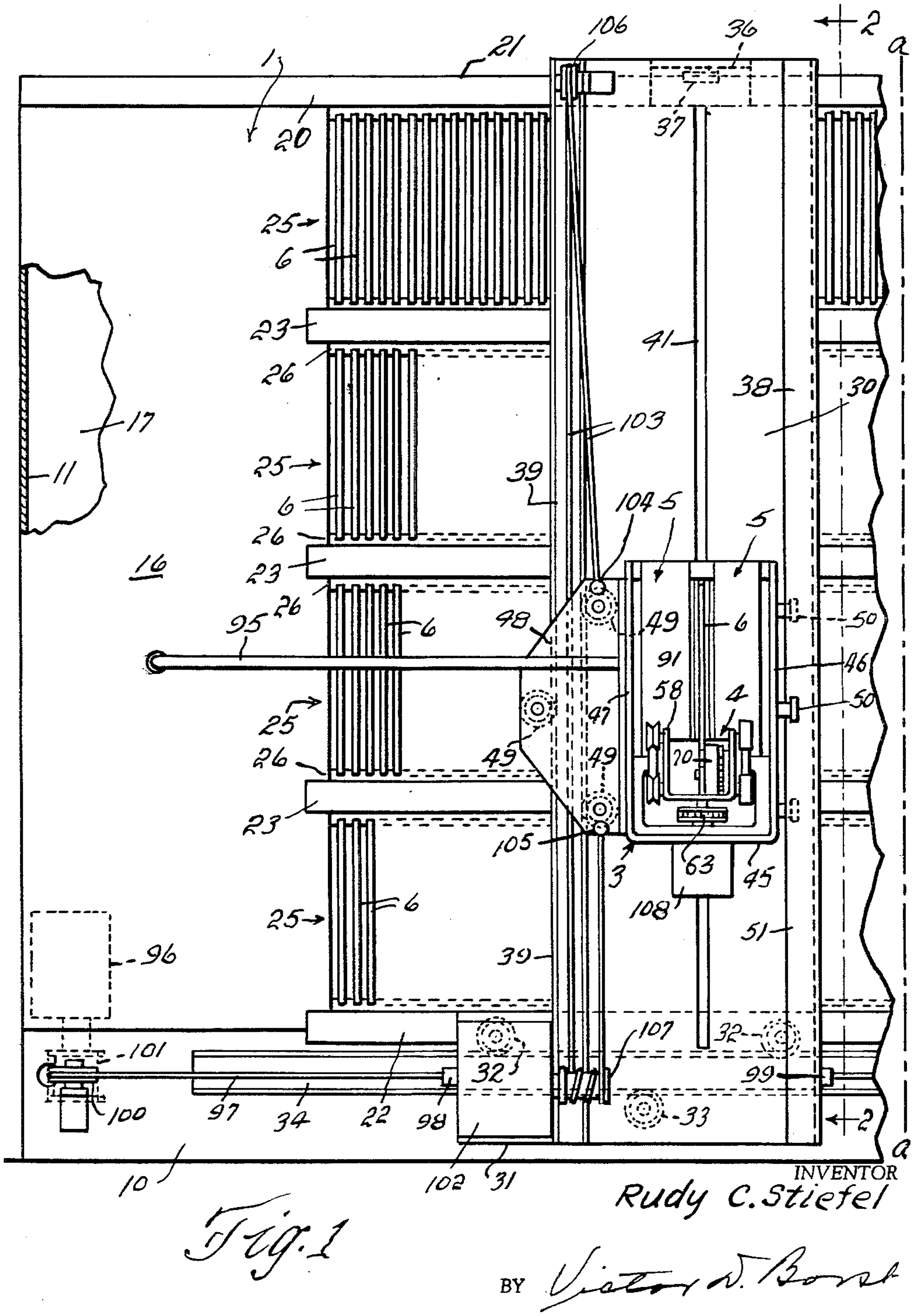
Figures 1A, 9, 10, 11:
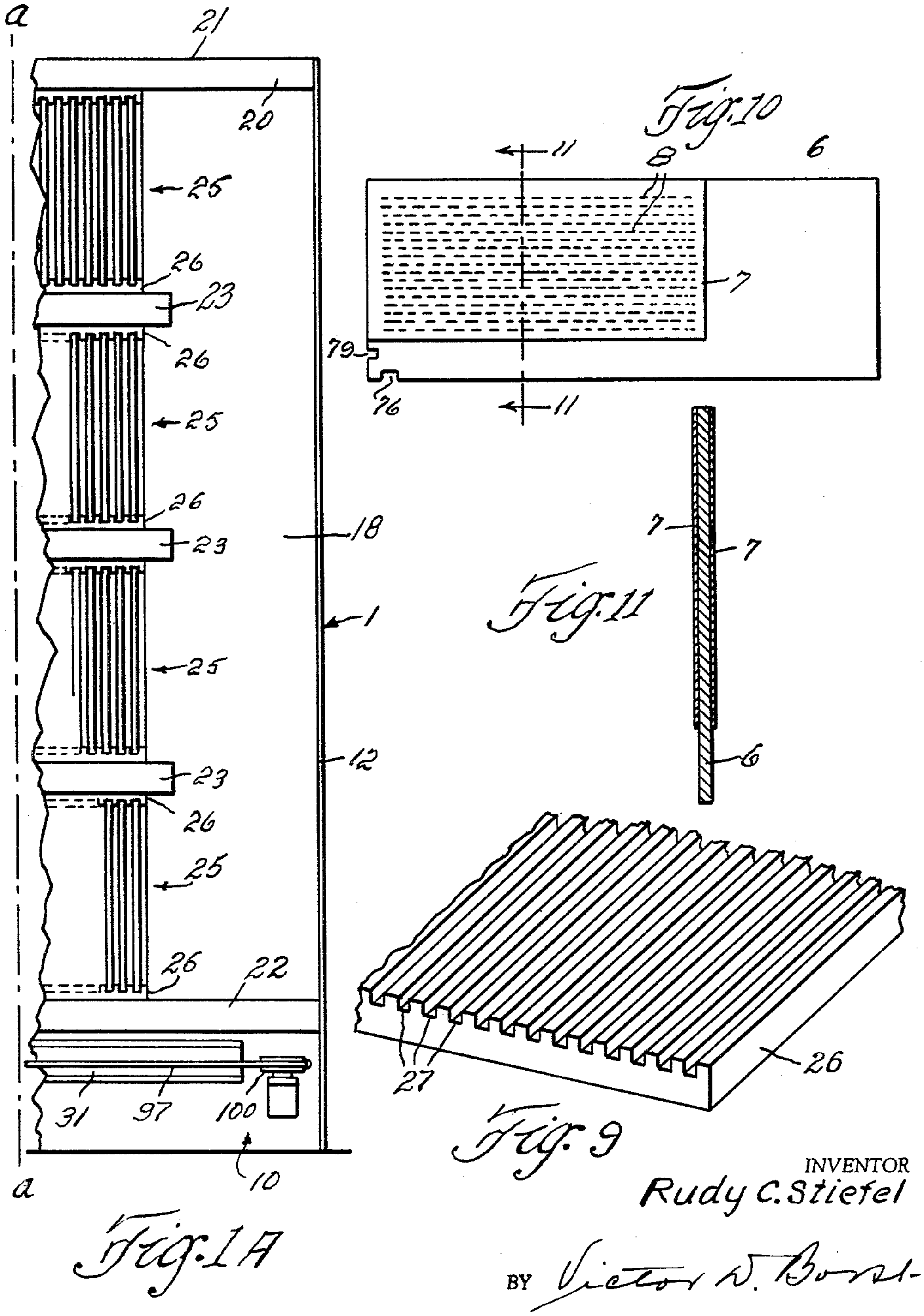
Fig. 9 is a fragmentary perspective view of one of the card racks by which the cards are slidably mounted in the card case.
Fig. 10 is a side elevation of one of the magnetic cards used in connection with the apparatus.
Fig. 11 is an enlarged vertical section taken on the line 11—11 of Fig. 10.

The construction and operation of the apparatus will now be described in detail in connection with the drawing by the use of reference characters. As shown herein the apparatus comprises a card case or cabinet 1, a vertically disposed laterally movable carriage 2, a horizontally disposed vertically movable carriage 3, a card pulling mechanism 4 and a pair of opposed read-write magnetic head assemblies 5. In connection with this apparatus I employ a great number of similar cards 6 which are preferably made of suitable plastic material. A portion of each side of the cards has a thin layer of magnetizable material such as iron oxide applied thereto as shown at 7 in Figs. 10 and 11. The information to be stored is magnetically impressed on the coated surfaces of the cards in spaced parallel horizontal tracks 8 as shown in Fig. 10.

Figure 2:
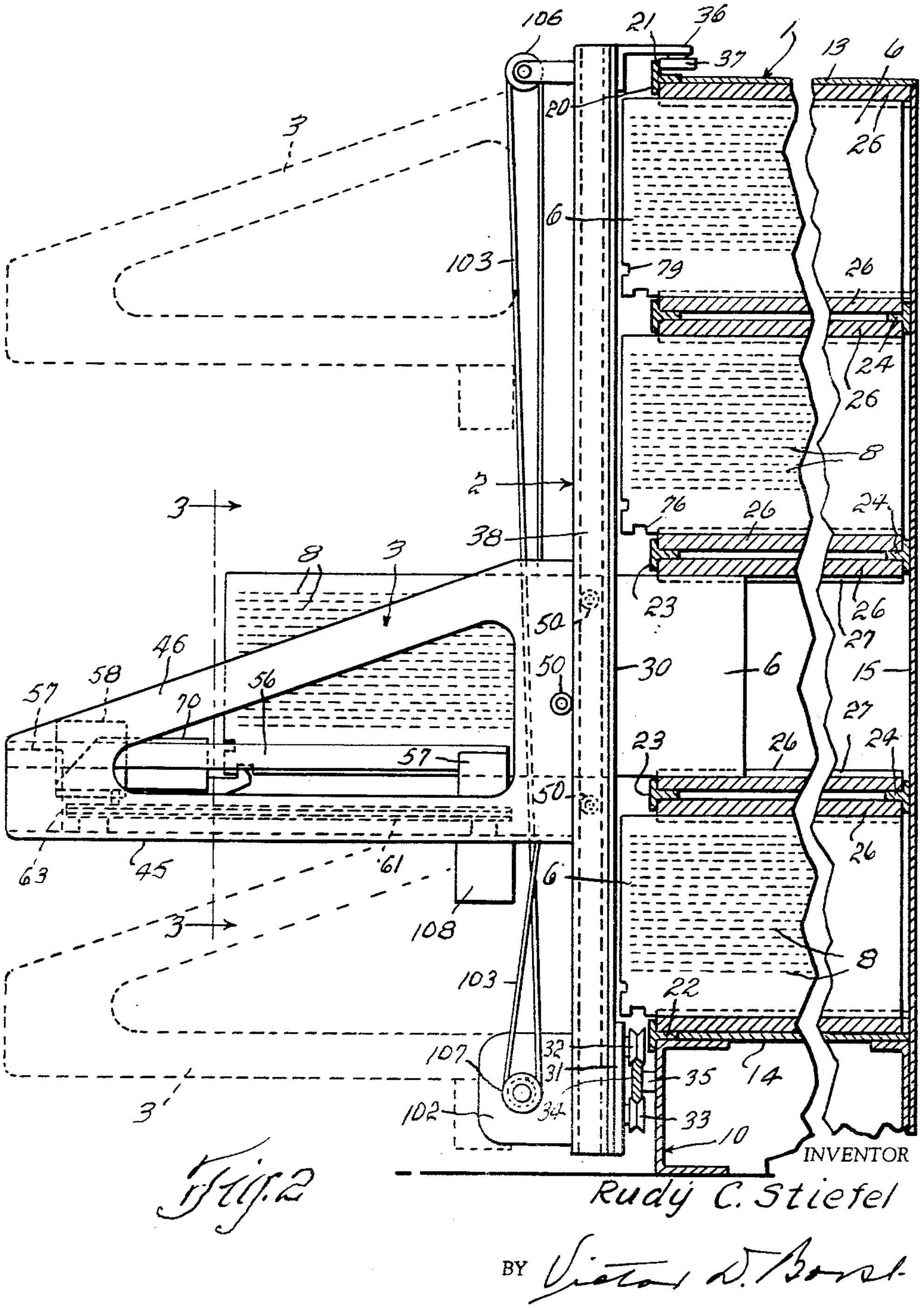
Fig. 2 is vertical transverse section taken on the line 2—2 of Fig. 1.

The card case or cabinet 1 which is mounted on a base 10 of channel irons comprises the end walls 11 and 12, the top and bottom walls 13 and 14, and the rear wall 15. Adjacent the end wall 11 the front of the cabinet is provided with a plate 16 which extends from the top to the bottom of the cabinet and constitutes the front wall of a chamber 17 within the cabinet; and adjacent the end wall 12 the front of the cabinet is provided with a plate 18 which extends from the top to the bottom of the cabinet. The front 19 of the cabinet between the plates 16 and 18 is open as clearly shown in Figs. 1, 1A and 2. A T-iron 20 which extends across the open front 19 of the cabinet at the top thereof with one arm 21 projecting up beyond the top wall 13 is secured to the plates 16 and 18. A similar T-iron 22 extends across the open front 19 of the cabinet at the bottom thereof parallel to the T-iron 20 and is secured to the base 10 and plates 16 and 18. Three equally spaced T-irons 23, similar to the T-irons 20 and 22, extend across the open front 19 of the cabinet between the T-irons 20 and 22 parallel thereto and are secured to the plates 16 and 18. And three T-irons 24, similar to the T-irons 23, are secured to the back wall 15 of the cabinet 1 in horizontal alignment with the T-irons 23.

Four superimposed horizontally extending card racks 25 are disposed within the cabinet 1 between the plates 16 and 18. Each rack 25 comprises a pair of opposed similar plates 26, which are supported by the T-bars 20 to 24 and extend from the front to the rear of the cabinet 1 and from the wall 16 to the wall 18. Each plate 26 is provided with a plurality of equally spaced parallel slots or grooves 27, which extend from the front to the rear of the plate, in which the cards 6 are slidably mounted. The depth of the cabinet 1 and the length of the cards 6 are so proportioned with respect to each other that the forward ends of the card 6 will extend out beyond the front of the cabinet when the cards are in their normal position in the cabinet, as clearly shown in Fig. 2; and the various racks 25 are so arranged with respect to each other that the cards 6 in any one rack 25 will be in vertical alignment with the cards in the other racks 25.

The vertically disposed laterally movable carriage 2 comprises an elongated vertically disposed rectangular plate 30 which extends from the top to the bottom of the cabinet across all of the racks 25 and has a horizontally extending plate 31 permanently secured to the lower end thereof. The plate 31 has a pair of horizontally spaced similar grooved rollers 32 rotatably secured to the rear face thereof adjacent the upper edge thereof, and a roller 33 similar to the rollers 32 rotatably mounted thereon adjacent the lower edge thereof intermediate the rollers 32. The rollers 32 are adapted to ride on the upper edge of a horizontally extending track 34 which is secured to the base 10 of the cabinet 1 by spacers 35 and extends substantially from end to end thereof; and the roller 33 is adapted to engage the lower edge of the track 34. A rearwardly extending bracket 36 carries a roller 37 which is adapted to engage the rear face of the upwardly extending flange 21 of the T-bar 20 which is secured to the front of the cabinet at the upper end thereof. By this means the carriage 2 is movably secured to the front of the cabinet in slightly spaced relation thereto for lateral movement horizontally from end to end thereof. The plate 30 has a vertically disposed channel iron 38, which extends from the top to the bottom thereof, secured thereto adjacent one side thereof; and adjacent the other side thereof the plate 30 has a rail 39, which likewise extends from the top to the bottom thereof, secured thereto by spacers 40. Between the channel iron 38 and the rail 39 the plate 30 is provided with a vertical slot 41 which extends across all of the racks 25.

The horizontally disposed carriage 3 which is mounted upon the carriage 2 for vertical up and down movement between the top and bottom thereof comprises a U-shaped frame having a base 45 and the spaced parallel upwardly extending sides 46 and 47. The side 47 has an outwardly extending bracket 48 secured thereto on which are rotatably mounted three similar vertically spaced grooved rollers 49, two of which adapted to engage one edge of the rail 39 and the other of which is adapted to engage the opposite edge of the rail 39; and the side 46 of the carriage 3 has three similar vertically spaced cylindrical rollers 50 rotatably mounted thereon, two of which are adapted to engage the inner face of the forward side 51 of the channel iron 38 and the other of which is adapted to engage the outer face of the side 51. The carriage 3 is thereby mounted upon the carriage 2 for vertical up and down movement between the top and bottom thereof.

The card pulling mechanism by which a selected card is partially withdrawn from the cabinet 1 between the opposed read-write magnetic head assemblies 5 and returned to its normal position in the cabinet is mounted upon the carriage 3 for movement therewith and comprises a pair of spaced parallel horizontal rails 55 and 56 which are held in fixed position by a pair of brackets 57 which are secured to the base 45 of the carriage 3. A U-shaped slide 58 is reciprocally mounted upon the rails 55 and 56 by two pair of grooved rollers 59 which are adapted to engage the upper and lower edges of the rail 55, and a pair of flat rollers 60 which are adapted to engage the upper and lower edges of the rail 56. The slide 58 is reciprocated by an endless chain 61 which is mounted below the slide 58 upon a driven sprocket 62 and an idler sprocket 63 which are respectively rotatably mounted upon the base 45 of the carriage 3 adjacent the inner and outer ends thereof. The chain 61 is operatively connected to the slide 58 by a pin 64 which is carried by the chain 61 and extends upwardly therefrom and into a transversely extending slot 65 in the bottom of the slide 58.

Figures 3, 7, 8:
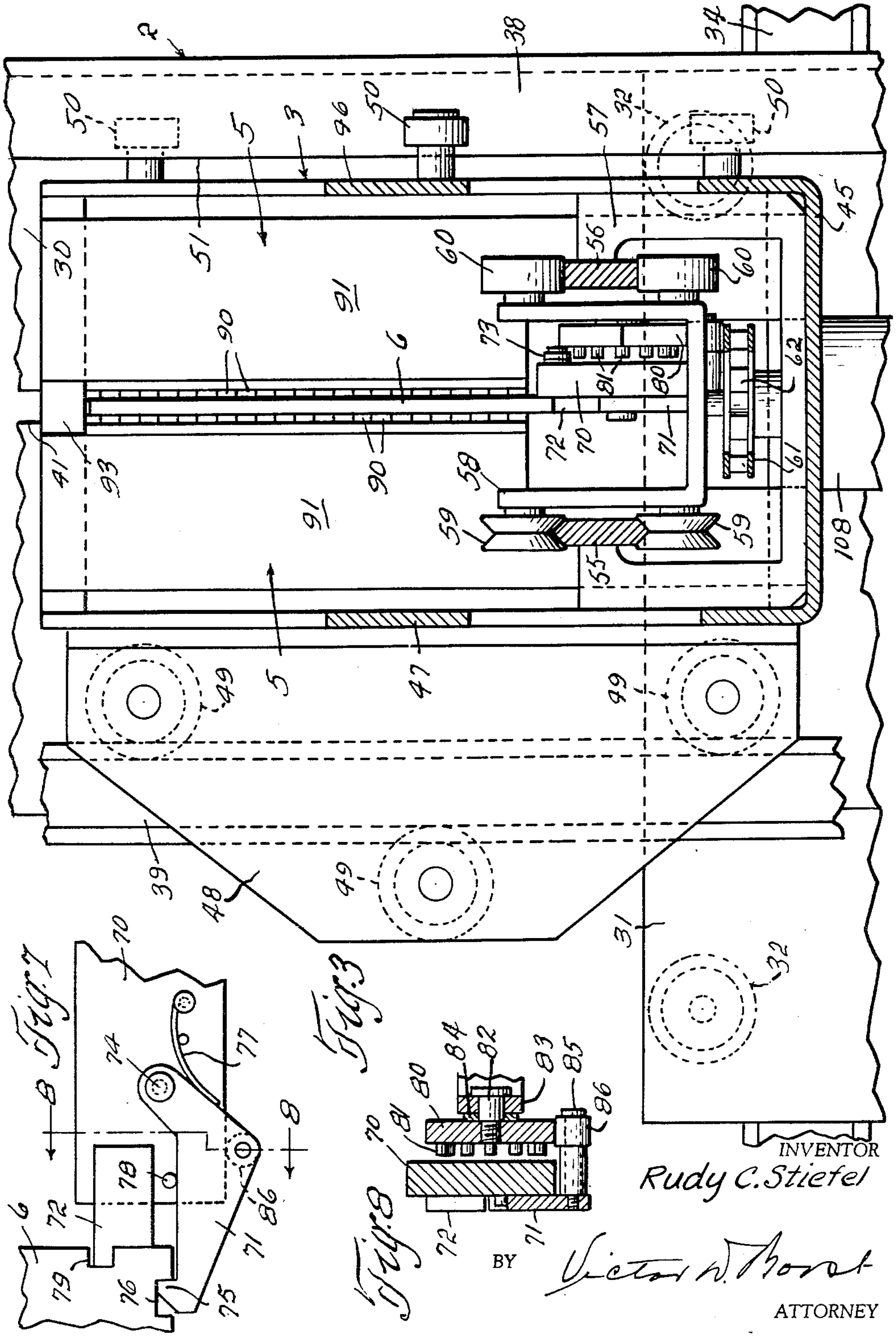
Fig. 3 is a vertical section taken on the lines 3—3 on Figs. 2 and 5.
Fig. 7 is a fragmentary detail view showing the card puller hook in side elevation.
Fig. 8 is a detail section taken on the line 8—8 of Fig. 7.

The slide 58 has an upwardly and rearwardly extending bracket 70 secured thereon on one side of which are mounted a card puller arm 71 and a card pusher plate 72, and on the other side of which is pivotally mounted a pawl 73. The card puller 71 which is pivotally secured to the bracket 70 at 74 extends out beyond the inner end of the bracket 70 and is provided at the free end thereof with a hook 75 which is adapted to engage a notch 76 in the lower edge of the cards 6 adjacent the forward or outer edge thereof. The card puller 71 is yieldingly biased to the position shown in Figs. 5 and 7 by suitable spring means 77, a stop 78 being provided to limit the movement thereof. The card pusher plate 72 which is rigidly secured to the bracket 70 above the puller 71 extends out beyond the end of the bracket 70 and is adapted to engage in a notch 79 in outer edge of the cards 6.

Figures 4, 12:
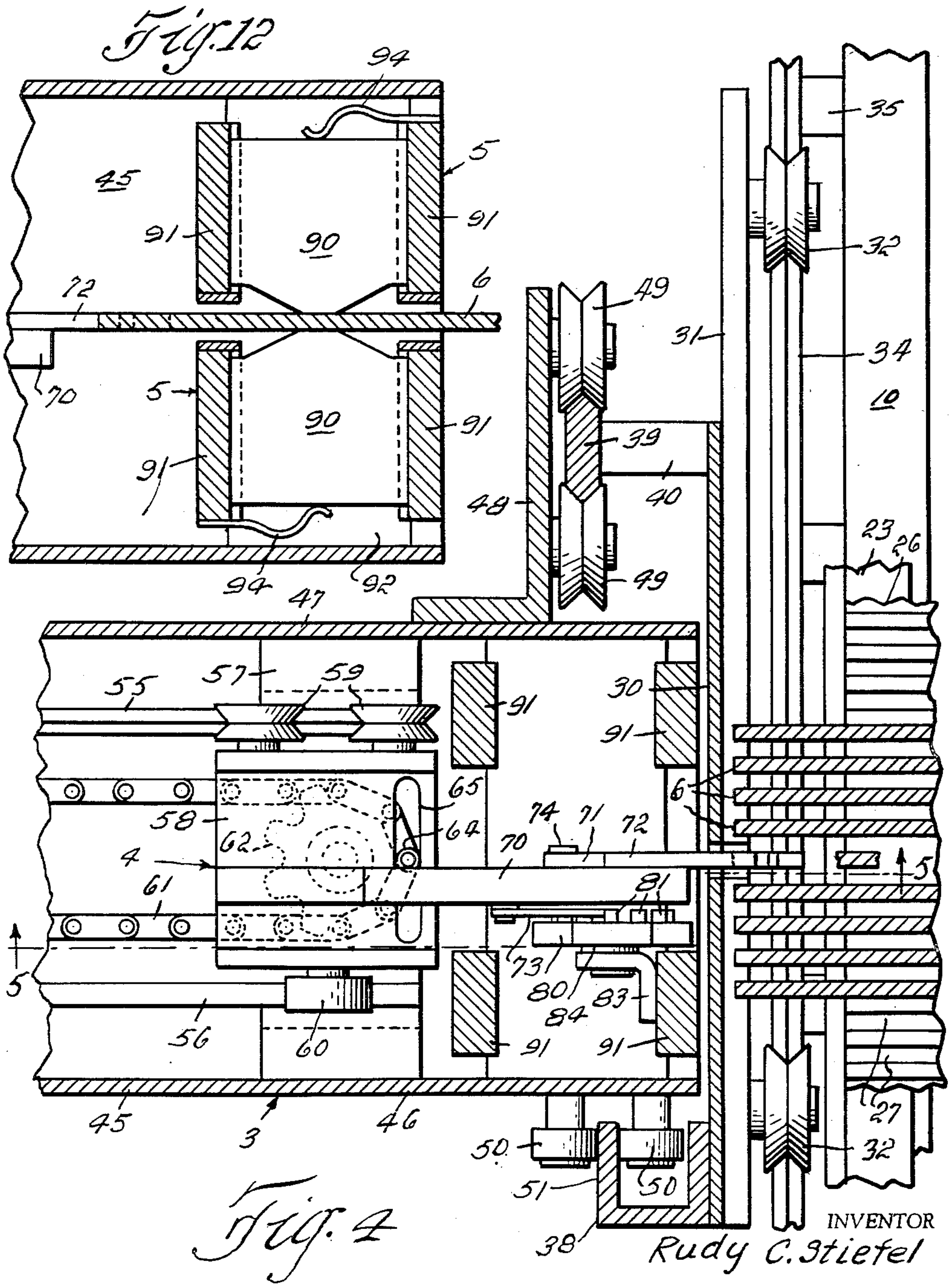
Fig. 4 is a fragmentary horizontal section taken on the line 4—4 on Fig. 5.
Fig. 12 is a fragmentary section taken on the line 12—12 of Fig. 5 showing a card being withdrawn from the cabinet between a pair of opposed magnetic heads.
Figures 5, 6:
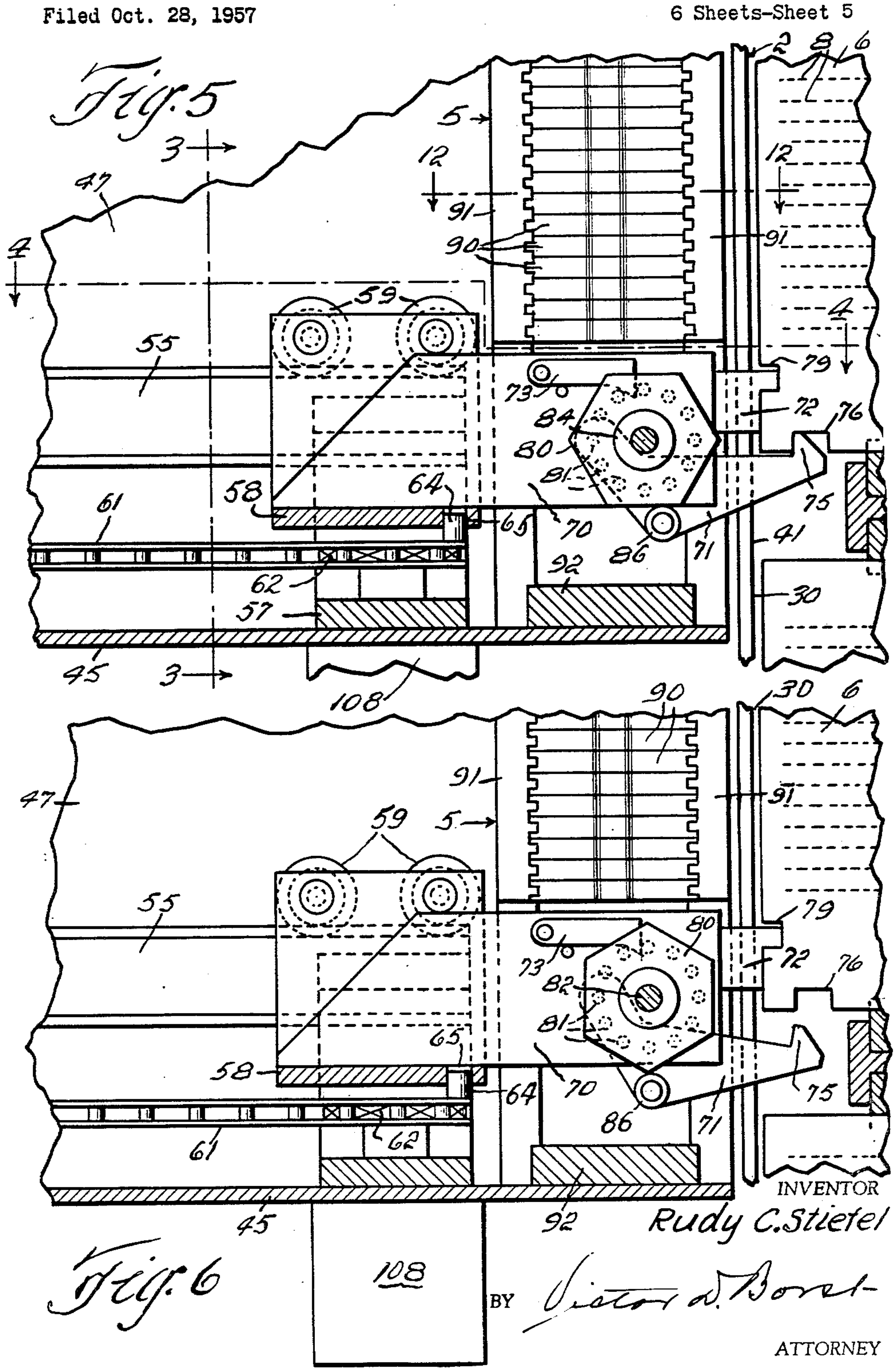
Fig. 5 is a fragmentary vertical section taken substantially on the line 5—5 on Fig. 4, and showing the card puller mechanism engaging a card preparatory to withdrawing it from the cabinet.
Fig. 6 is a view similar to Fig. 5, showing the card puller mechanism released from a card after returning it to the cabinet.

A hexagonal disk 80 having twelve equally spaced outwardly extending short pins 81 secured to one face thereof in an annular row, is rotatably mounted by a pivot stud 82 in fixed position beneath the read-write assemblies 5 upon a bracket 83 which is secured to one of the vertical supports for the read-write assemblies. A spring washer 84 which acts as a friction brake for the disk 80 is mounted upon the stud 82 between the disk 80 and the bracket 83. The disk 80 is disposed a short distance to one side of the path of movement of the bracket 70 in position for the pawl 73 to engage the pins 81 and thereby rotate the disk 80 through thirty degrees (30°) each time the slide 58, and with it the bracket 70 and parts carried thereby, is advanced to its innermost position as shown in Figs. 4, 5 and 6. The puller arm 71 carries a pivot stud 85 which extends outwardly therefrom under the bracket 70 and has a roller 86 mounted thereon in position to engage the disk 80.

In withdrawing a selected card from and returning it to position in the cabinet the slide 58 makes two complete reciprocations from its normal at rest position which is adjacent the outer end of the carriage 3. After a card has been returned to the cabinet and the slide 58 retracted to its normal at rest position the disk 80 is always left in the position shown in Fig. 6 in which position it is yieldingly held by the spring washer 84. Then on the next advancement of the slide 58 in order to withdraw a card the pawl 73 engages a pin 81 and rotates the disk 80 from the position shown in Fig. 6 to the position shown in Fig. 5 thereby permitting the spring 77 to raise the puller arm 71 from the position shown in Fig. 6 up into the position shown in Fig. 5 with the hook 75 engaging in the notch 76 of a card. The retraction of the slide then withdraws the card from the cabinet out through the slot 41 in the carriage 2 and between the two opposed read-write assemblies, leaving the disk 80 in the position shown in Fig. 5. During the subsequent advancement of the slide 58 to return the card to place in the cabinet the pawl 73 engages a pin 81 and rotates the disk from the position shown in Fig. 5 to the position shown in Fig. 6 thereby withdrawing the hook 75 from the notch 76. The slide is then returned to its normal at rest position, leaving the disk in the position shown in Fig. 6, ready for the next card withdrawal. The pusher plate 72 through which a card is pushed back into the cabinet is also operative, during both the withdrawal and the returning of a card, to prevent tilting or tipping of a card due to its engagement in the notch 79 thereby assuring engagement of the hook 75 in the notch 76 until it is withdrawn therefrom by the rotation of the disk 80.

The opposed read-write magnetic head assemblies 5 each comprises a plurality of super-imposed similar contact type magnetic heads 90 which are individually slidably mounted between opposed similar uprights 91. The uprights 91 of each assembly are secured to and extend upwardly from a bottom plate 92 which is secured in fixed position to the base 45 of the slide 3 adjacent the inner end thereof. The upper ends of the uprights 91 are connected to a top plate 93. The heads 90 are so positioned by the uprights 91 that they will engage the tracks 8 on the cards 6 as a card is withdrawn between the two opposed read-write assemblies, there being an individual head 90 for each track 8 on the cards. Each individual head in one assembly is yieldingly biased toward the opposed head in the other assembly by a spring 94. The individual heads are thereby held in firm contact with the tracks 8 as cards are withdrawn. The heads 90 are electrically connected to an external control register by suitable conductors which are disposed in a cable 95 mounted on a spring loader reel (not shown) within the chamber 17.

The vertically disposed carriage 2 is adapted to be moved back and forth across the front of the cabinet 1 by a digital positional servo 96, within the chamber 17, by means of a cable 97 having the ends thereof connected to opposite sides of the carriage 2 as indicated at 98 and 99. The cable 97 is mounted upon idler pulleys 100 on the base 10 and between the ends thereof is wound about a drum 101 which is driven in either direction by the servo 96.

The horizontally disposed carriage 3 is adapted to be moved up and down upon the carriage 2 by a modified servo 102, which is mounted upon the carriage 2, by means of a cable 103 having the ends thereof connected to the carriage 3 adjacent the top and bottom thereof as indicated at 104 and 105. From the connection 104 the cable 103 extends up and around an idler pulley 106, carried by the carriage 2 adjacent the upper end thereof, thence down and several turns around a drum 107 which is adapted to be rotated in either direction by the servo 102. From the drum 107 the cable extends up to the connection 105.

The endless chain 61 by which the slide 58 is reciprocated to withdraw cards from and return them to the cabinet 1 is, as previously stated, mounted upon a driven sprocket 62 which is adapted to be rotated in one direction only by a suitable motor and reducing gearing, generally indicated by 108, which is secured to the under side of the base 45 of the carriage 3.

In operation when a certain bit of information is desired the proper code therefor is fed into the control mechanism which effects the operation of the servo 96 to move the carriage 2 in the proper direction to bring the slot 41 therein into register with the vertically aligned row of cards in which the card having the desired information thereon is located. At the same time the control mechanism effects the operation of the servo 102 to simultaneously move the carriage 3 up or down into register with the horizontally disposed row of cards in which the card having the desired information thereon is mounted. At the completion of these movements of the carriages 2 and 3 the card puller mechanism 4 and the read-write assemblies 5 are in register with the card having the desired information thereon, at which time the motor 108 is set in operation to reciprocate the slide 58 to withdraw the card from and return it to the cabinet in the manner previously described. As the card is withdrawn between the read-write assemblies 5 the information thereon is read by the magnetic heads 90 through an external control register which is preset by the fed-in code to transmit only the desired portions of the total data read out from the card to a buffer storage or directly to output equipment.

From the foregoing it will be apparent to those skilled in this art that I have provided a relatively simple and highly efficient mechanism for accomplishing the objects of the invention.

It is to be understood that I am not limited to the specific construction shown and described herein as various modifications may be made therein within the spirit of the invention and the scope of the appended claims.

I claim:

1. A mechanism for storing selecting and reproducing magnetically recorded information comprising a great plurality of similar magnetic cards on each of which a plurality of bits of information are magnetically recorded in spaced parallel straight tracks, a card cabinet open at the front thereof, cards supporting means in said cabinet by which said cards are slidably mounted in said cabinet in spaced relation to each other in a plurality of vertically stacked horizontally extending rows, a vertically disposed carriage slidably mounted for horizontal back and forth movement between the cards in said rows, said vertically disposed carriage being mounted on said cabinet adjacent the open front end thereof and extending from the top to the bottom of said rows of cards in said cabinet, a horizontally disposed carriage slidably mounted on said vertically disposed carriage for vertical up and down movement between said vertically stacked horizontally extending rows in said cabinet, a card puller mechanism reciprocally mounted on said horizontally disposed carriage for movement toward and away from said vertically disposed carriage and which is operative to withdraw an aligned card from said cabinet and to return said card to said cabinet, a plurality of super-imposed vertically aligned magnetic reproducing heads carried by said horizontally disposed carriage in position to register with and engage the said tracks on said card as it is being withdrawn from said cabinet, actuating means by which said horizontally disposed vertically movable carriage is brought into register with a selected row of said cards, actuating means by which said vertically disposed horizontally movable carriage is brought into register with a selected card in said selected row, and actuating means by which said card puller mechanism is actuated to withdraw said selected card in alignment therewith from said cabinet and return said card into position in said cabinet.

2. A mechanism for storing selecting and reproducing magnetically recorded information as defined in claim 1 in which all of said actuating means are responsive to a fed-in code signal imparted to said mechanism.

3. A mechanism for storing selecting and reproducing magnetically recorded information comprising a great plurality of similar magnetic cards on each of which information is magnetically recorded in a straight track, a card cabinet open at the front thereof, card supporting means in said cabinet by which said cards are slidably mounted in said cabinet in spaced relation to each other, a vertically disposed carriage slidably mounted on said cabinet adjacent the open front end thereof for horizontal back and forth movement from side to side of said cabinet, a horizontally disposed carriage slidably mounted on said vertically disposed carriage for vertical up and down movement between the top and bottom of said cabinet, a card puller mechanism reciprocally mounted on said horizontally disposed carriage for movement toward and away from said vertically disposed carriage and which is operative to withdraw a card disposed in alignment therewith from said cabinet and return said card to said cabinet, a magnetic reproducing head mounted on said horizontally disposed carriage in position to register with and engage the track on a card as it is withdrawn from said cabinet by said card puller mechanism, actuating means by which said vertically disposed carriage and said horizontally disposed carriage are moved into position to bring said card puller mechanism into alignment with a selected card in said cabinet, and actuating means by which said card puller mechanism is operated to withdraw said selected card from said cabinet and return said selected card to said cabinet.

4. A mechanism for storing selecting and reproducing magnetically recorded information as defined in claim 3 in which all of said actuating means are responsive to a fed-in code signal imparted to said mechanism.

5. A mechanism for storing selecting and reproducing magnetically recorded information comprising a great plurality of similar magnetic cards on each of which a plurality of bits of information are magnetically recorded in spaced parallel straight tracks on each side of said cards, a card cabinet open at the front thereof, cards supporting means in said cabinet by which said cards are slidably mounted in said cabinet in spaced relation to each other in a plurality of both horizontally and vertically disposed rows, a vertically disposed carriage slidably mounted on said cabinet adjacent the open front thereof for horizontal back and forth movement between the vertically disposed rows of cards in said cabinet, a horizontally disposed carriage slidably mounted on said vertically disposed carriage for vertical up and down movement between the horizontally disposed rows of cards in said cabinet, a card puller mechanism carried by said horizontally disposed carriage which is operative to withdraw an aligned card from said cabinet and return said card to said cabinet, a pair of opposed similar reproducing head assemblies each of which comprises a plurality of superimposed vertically aligned magnetic reproducing heads, said pair of reproducing head assemblies being mounted on said horizontally disposed carriage in position to register with and engage the tracks on each side of said card as said card is withdrawn from said cabinet between said reproducing head assemblies by said card puller mechanism, actuating means by which said vertically disposed carriage is brought into register with a selected vertically disposed row of cards, actuating means by which said horizontally disposed carriage is brought into register with a selected horizontally disposed row of cards, and actuating means by which said card puller mechanism is operated to withdraw an aligned card from said cabinet and return said card to said cabinet.

6. A mechanism for storing selecting and reproducing magnetically recorded information comprising a great plurality of similar magnetic cards on each of which a plurality of bits of information are magnetically recorded in spaced parallel straight tracks on each side of said cards, a vertically disposed carriage slidably mounted for horizontal back and forth movement between the cards in said rows, said vertically disposed carriage being mounted on said cabinet adjacent the open front end thereof and extending from the top to the bottom of said rows of cards in said cabinet, a horizontally disposed carriage slidably mounted on said vertically disposed carriage for vertical up and down movement between said vertically stacked horizontally extending rows in said cabinet, a card puller mechanism carried by said horizontally disposed carriage which is operative to withdraw an aligned card from said cabinet and to return said card to said cabinet, a pair of opposed similar reproducing head assemblies each of which comprises a plurality of superimposed vertically aligned magnetic reproducing heads, said pair of reproducing head assemblies being mounted on said horizontally disposed carriage in position to register with and engage the tracks on each side of said card as said card is withdrawn from said cabinet between said reproducing head assemblies by said card puller mechanism, actuating means by which said horizontally disposed vertically movable carriage is brought into register with a selected row of said cards, actuating means by which said vertically disposed horizontally movable carriage is brought into register with a selected card in said selected row, and actuating means by which said card puller mechanism is actuated to withdraw said selected card in alignment therewith from said cabinet and return said card into position in said cabinet.

7. A mechanism for storing selecting and reproducing magnetically recorded information comprising a great plurality of similar magnetic cards on each of which a plurality of bits of information are magnetically recorded in spaced parallel straight tracks on each side of said cards, a card cabinet open at the front thereof, a horizontally disposed vertically movable carriage slidably mounted on said vertically disposed carriage, a card puller mechanism carried by said horizontally disposed carriage which is operative to withdraw an aligned card from said cabinet and return said card into position in said cabinet, a pair of opposed similar reproducing head assemblies each of which comprises a plurality of superimposed vertically aligned magnetic reproducing heads, said pair of reproducing head assemblies being mounted on said horizontally disposed carriage in position to register with and engage the tracks on each side of said card as said card is withdrawn from said cabinet between said reproducing head assemblies by said card puller mechanism, means by which said vertically disposed horizontally movable carriage is brought into register with a selected vertically disposed row of cards in said cabinet, means by which said horizontally disposed vertically movable carriage is brought into register with a selected card in said vertically aligned row of cards, and means by which said card puller mechanism is actuated to withdraw said selected card in alignment therewith from said cabinet and return said selected card into position in said cabinet.

8. A mechanism for storing selecting and reproducing magnetically recorded information comprising a great plurality of similar magnetic cards on each of which a plurality of bits of information are magnetically recorded in spaced parallel straight tracks on each side of said cards, a card cabinet open in the front thereof, cards supporting means in said cabinet by which said cards are slidably mounted in said cabinet in spaced relation to each other, a vertically disposed carriage slidably mounted on said cabinet adjacent the open front end thereof for horizontal back and forth movement from side to side of said cabinet, a horizontally disposed carriage slidably mounted on said vertically disposed carriage for vertical up and down movement between the top and bottom of said cabinet, a card puller mechanism mounted on said horizontally disposed carriage which is operative to withdraw a card disposed in alignment therewith from said cabinet and return said card to said cabinet, a pair of opposed similar reproducing head assemblies each of which comprises a plurality of superimposed vertically aligned magnetic reproducing heads, said pair of reproducing head assemblies being mounted on said horizontally disposed carriage in position to register with and engage the tracks on each side of said card as said card is withdrawn from said cabinet between said reproducing head assemblies by said card puller mechanism, actuating means by which said vertically disposed carriage is moved into position to bring said card puller mechanism into vertical register with a selected card in said cabinet, actuating means by which said horizontally disposed carriage is moved into position to bring said card puller mechanism into horizontal register with said selected card, and actuating means by which said card puller mechanism is operated to withdraw said selected card from said cabinet and return said selected card to said cabinet.

9. A mechanism for storing selecting and reproducing magnetically recorded information comprising a great plurality of similar magnetic cards on each of which a plurality of bits of information are magnetically recorded in spaced parallel straight tracks on each side of said cards, a card cabinet open in the front thereof, cards supporting means in said cabinet by which said cards are slidably mounted in said cabinet in spaced relation to each other, a vertically disposed carriage slidably mounted on said cabinet adjacent the open front end thereof for horizontal back and forth movement from side to side of said cabinet, a horizontally disposed carriage slidably mounted on said vertically disposed carriage for vertical up and down movement between the top and bottom of said cabinet, a card puller mechanism mounted on said horizontally disposed carriage which is operative to withdraw a card disposed in alignment therewith from said cabinet and return said card to said cabinet, a pair of opposed similar reproducing head assemblies each of which comprises a plurality of superimposed vertically aligned magnetic reproducing heads, said pair of reproducing head assemblies being mounted on said horizontally disposed carriage in position to register with and engage the tracks on each side of said card as said card is withdrawn from said cabinet between said reproducing head assemblies by said card puller mechanism, actuating means by which said vertically disposed carriage and said horizontally disposed carriage are moved into position to bring said card puller mechanism into alignment with a selected card in said cabinet, and atuating means by which said card puller mechanism is operated to withdraw said selected card from said cabinet and return said selected card to said cabinet.

10. A mechanism for storing selecting and reproducing magnetically recorded information comprising a great plurality of similar magnetic cards on each of which information is magnetically recorded in a straight track on each side of said cards, a card cabinet open at the front thereof, card supporting means in said cabinet by which said cards are slidably mounted in said cabinet in spaced relation to each other, a vertically disposed carriage slidably mounted on said cabinet adjacent the open front end thereof for horizontal back and forth movement from side to side of said cabinet, a horizontally disposed carriage slidably mounted on said vertically disposed carriage for vertical up and down movement between the top and bottom of said cabinet, a card puller mechanism mounted on said horizontally disposed carriage which is operative to withdraw a card disposed in alignment therewith from said cabinet and return said card to said cabinet, a pair of opposed similar magnetic reproducing heads mounted on said horizontally disposed carriage in position to register with and engage the tracks on each side of a selected card as said card is withdrawn from said carriage between said magnetic reproducing heads by said card puller mechanism, actuating means by which said vertically disposed carriage and said horizontally disposed carriage are moved into position to bring said card puller mechanism into alignment with a selected card in said cabinet, and actuating means by which said card puller mechanism is operated to withdraw said selected card from said cabinet and return said selected card to said cabinet.

11. A mechanism for storing selecting and reproducing magnetically recorded information as defined by claim 10, in which said card puller mechanism comprises a slide reciprocally mounted on said horizontally disposed carriage, a card hook pivotally mounted on said slide and adapted to releasably grip a slidably supported card to withdraw said card outwardly from its supporting means upon the reciprocation of said slide, means by which said slide is reciprocated, means by which said card hook is moved into gripping engagement with a card prior to its withdrawal from its supporting means, and means by which said hook is moved out of gripping engagement with said card subsequent to the return of said card to its supporting means.

12. A mechanism for storing selecting and reproducing magnetically recorded information as defined by claim 11 in which all of said actuating means are responsive to a fed-in code signal imparted to said mechanism.

13. A mechanism for storing selecting and reproducing magnetically recorded information as defined by claim 10 in which said card puller mechanism comprises a slide reciprocally mounted on said horizontally disposed carriage, a card hook pivotally mounted on said slide and adapted to releasably grip a slidably supported card to withdraw said card outwardly from its supporting means and to return said card to its supporting means upon the reciprocation of said slide, means by which said slide is reciprocated, means by which said hook is inserted into said notch prior to the withdrawal of said card from its supporting means, and means by which said hook is removed from said notch subsequent to the return of said card to its supporting means.

14. A mechanism for storing selecting and reproducing magnetically recorded information as defined by claim 10, in which all of said actuating means are responsive to a fed-in code signal imparted to said mechanism.

References Cited in the file of this patent

UNITED STATES PATENTS

| | | |
|---|---|---|
| 1,585,867 | Kruse | May 25, 1926 |
| 1,593,151 | Whitmore | July 20, 1926 |
| 2,620,389 | Potter | Dec. 2, 1952 |
| 2,638,098 | Toepper | May 12, 1953 |
| 2,784,392 | Chaimowicz | Mar. 5, 1957 |
| 2,795,226 | Bralove | June 11, 1957 |